April 15, 1941. R. KALKUSCH Re. 21,771

BUILDING BLOCK AND FACING TILE

Original Filed March 13, 1936 2 Sheets-Sheet 1

Inventor:
Rudolph Kalkusch
By Williams, Bradbury, McCaleb & Hinkle. Attys

BUILDING BLOCK AND FACING TILE
Original Filed March 13, 1936 2 Sheets-Sheet 2
Fig. 7.
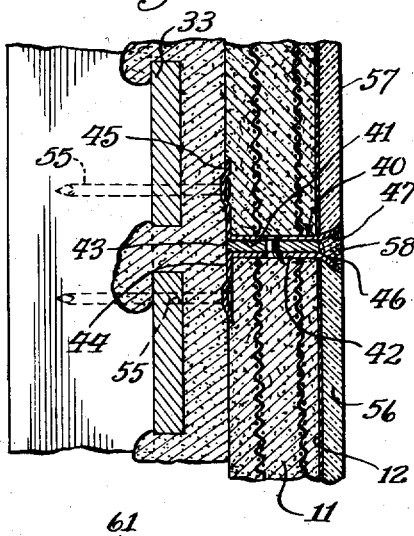
Fig. 9.
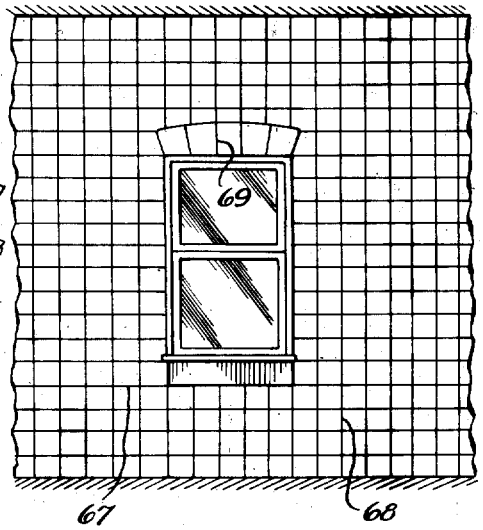
Fig. 8.
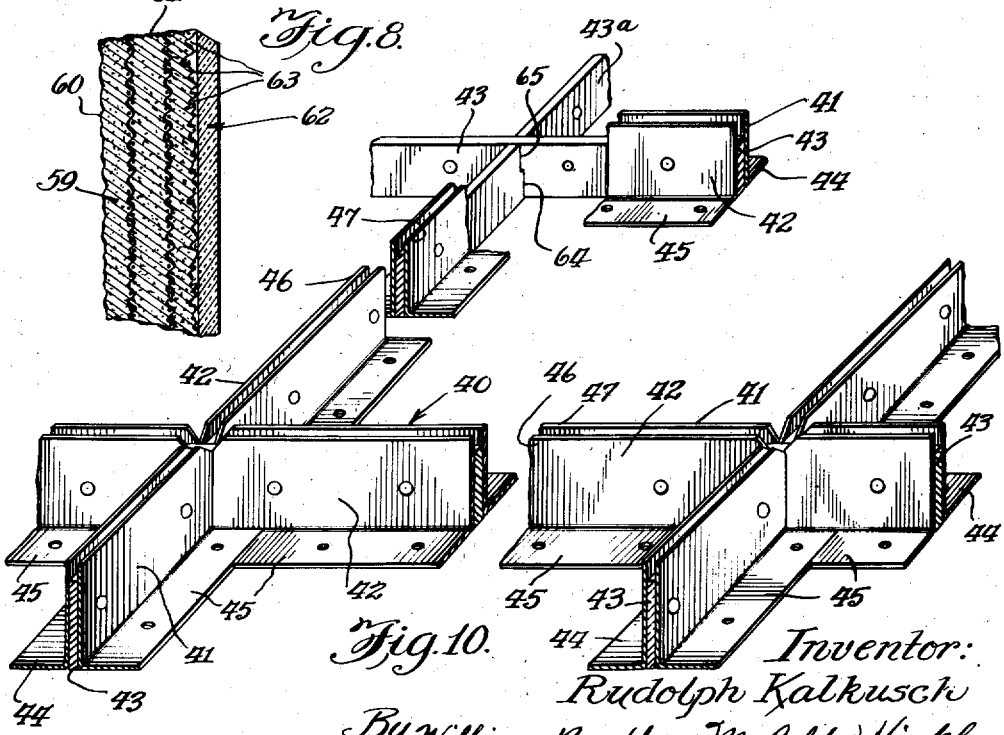
Fig. 10.
Inventor:
Rudolph Kalkusch
By Williams, Bradbury, McCaleb & Hinkle.
Attys.

Reissued Apr. 15, 1941 Re. 21,771

UNITED STATES PATENT OFFICE 21,771

BUILDING BLOCK AND FACING TILE

Rudolph Kalkusch, Chicago, Ill., assignor, by direct and mesne assignments, to Libbey-Owens-Ford Glass Company, Toledo, Ohio, a corporation of Ohio Original No. 2,058,235, dated October 20, 1936, Serial No. 68,659, March 13, 1936. Application for reissue October 19, 1938, Serial No. 235,870

12 Claims. (Cl. 72—35)

The present invention relates to building blocks and facing tiles, and is particularly concerned with blocks or tiles adapted to have one or more surfaces faced with glass or other equivalent material having qualities which peculiarly adapt such a facing for its functions.

In the building construction of the prior art, expensive facing tiles of special glass or glass compositions have been used, such as, for example, for facing the front of a store or other commercial establishment. These glass tiles of the prior art are expensive not only because of the material of which they are made, but because they must be made relatively thick in the effort to give them sufficient mechanical strength as distinguished from the glass facings made according to the present invention, where a very thin layer of glass may be used.

The glass tiles installed according to the prior methods have given a great deal of trouble by reason of their failure to be securely fastened to the wall, as glass will not adhere to mortar or putty for any length of time. One of the most important features of the present invention is that the glass facing is securely fastened on the concrete. With the present construction a builder or contractor can guarantee the satisfaction of the installation.

The prior glass plates used for facings have been secured in place by a plurality of spaced lumps or pieces of putty, the putty adhering to the concrete wall or plaster on one side and to the rear side of the glass plate at the opposite face of the putty. In such case the edges of the glass tiles bear against the tiles which are immediately beneath them, and the lowermost row of tiles is inevitably subjected to excessive strain. Furthermore, it is practically impossible to prevent the chipping of the glass tiles when installed according to the foregoing practice for the reason that it is impossible to secure the same bearing pressure throughout the entire bearing area of the lower edge of any tile, and the tile will chip at its face whenever any adjacent portion is subjected to more pressure by reason of a projection at the edge or for some other reason.

One of the objects of the invention is the provision of an improved method of installation of glass facings for all purposes of construction, such as walls, floors, ceilings and the like, including a glass facing which has a maximum mechanical strength and is adapted to resist deterioration from any cause.

Another object is the provision of an improved glass faced building block which has such a great mechanical strength and such bonding characteristics that it may be used like ordinary building bricks in the facing of any exposed surface of a building.

Another object is the provision of an improved building brick or tile which is just as strong or stronger than a tile or brick of glass of the same thickness, yet which may be constructed at a far lower cost than building blocks or tiles made completely of glass.

Another object is the provision of an improved glass facing tile or block which is adapted to become a substantially integral part of a wall and to add structural strength to the wall.

Another object is the provision of an improved mode of securing the glass facing on building blocks, tiles and other exposed building surfaces by means of an adhesive, with or without the supplemental support provided by metallic anchoring devices engaging the edges of the glass sheets.

Another object is the provision of an improved method of bonding glass sheets to concrete or other initially plastic cementitious material, and an improved method of constructing building blocks or tiles.

Another object is the provision of an improved mechanical anchoring device for securing glass sheets as facings upon concrete or other initially plastic blocks or tiles, which anchoring device also serves as a cushion for spacing the sheets of glass from each other.

Another object is the provision of an improved arrangement of such anchoring devices and spacers whereby the engagement of the cushions of the anchoring devices serves to cause the anchoring devices to grip resiliently the glass facing sheets which they engage.

Another object is the provision of an improved system of anchoring devices for glass faced concrete blocks or tiles by means of which the relative position of the tiles on the wall or other exposed building surface may be accurately predetermined at the factory in the manufacture of the anchoring devices. The purpose and advantage of this construction is not only to secure the glass faced tiles to any type of construction, but to make sure that the tiles are all accurately aligned on the wall or other surface and accurately spaced irrespective of irregularities in the manufacture of the tiles or in discrepancies of measurement by the workmen.

According to the present system every facing tile has its socket in a network of anchoring devices of metal and there is no possibility that the workmen may get the tile out of alignment because there is nothing to do except to place the tiles in the network in the position in which they are to fit according to the plan and according to the accurate construction of the metallic network of anchoring devices.

Other objects and advantages of the invention will be apparent from the following description and the accompanying drawings, in which similar characters of reference indicate similar parts throughout the several views.

Referring to the drawings:

Fig. 7 is another fragmentary sectional view taken through a wall which is faced with glass tile constructed according to the present invention;

Fig. 8 is a fragmentary sectional view of a modification;

Fig. 9 is a front elevational view of a fragment of a wall equipped with anchoring devices and faced with tile constructed according to the present invention;

Fig. 10 is a fragmentary view in perspective of the anchoring devices utilized in the installation of Fig. 9;

Figure 1:
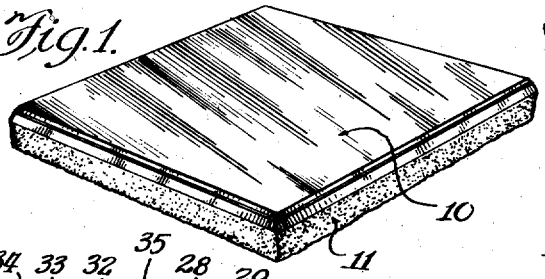
Fig. 1 is a view in perspective of a glass faced concrete tile constructed according to the present invention.

Referring to Fig. 1, the tile constructed according to the present invention preferably consists of a facing sheet of ordinary glass 10. While ordinary window glass may be used, it should also be understood that plate glass or any of the special more expensive glass facings sold on the market under various trade names, such as "Carrara," "Vitrolite," or others may be used. In such case the expensive glasses or glass compositions may be made much thinner than is the practice when they are installed according to the prior art, thereby effecting a very great saving in any event, and more securely fastening the glass to its support. The present invention is of particular advantage, however, when the tiles or blocks are constructed with ordinary window glass, since the cheapest forms of glass may be used. The quality of the finished product is, of course, in some measure dependent upon the regularity and quality of the glass used.

The tile also includes a backing 11 of special light aggregate concrete. This concrete backing may be made of ordinary Portland cement, sand and light aggregate, in the proportions of 1:2:4 or 1:½:4. Examples of the light aggregate which may be used are those sold on the market under the trade names of "Haydide" or "Waylite."

It should also be understood that any form of concrete may be used, and in fact various forms of initially plastic material may be employed, the principal disadvantage of ordinary concrete backings being that they are heavier.

The tile also preferably includes a layer of adhesive 12, preferably comprising an asphalt adhesive composition which is located between the glass 10 and concrete 11 and which firmly secures the glass facing to the concrete.

For the purpose of securing various decorative effects, glass may be used which has any color or pattern fused in the glass, but very beautiful effects may be secured by merely painting the rear surface with a layer 13 of paint of any desired color. The paint should preferably be of an asphaltic or other composition which does not react chemically with the adhesive layer 12.

In some embodiments of the invention the adhesive layer may provide the color for the rear surface of the glass facing. I find that glass tiles or blocks constructed according to the present invention have their facings of glass so securely mounted thereon that it is unnecessary to use other anchoring devices for the glass. However, for commercial reasons it is desirable in many cases to employ an additional anchoring device of the type shown at 14 in Fig. 4. I desire it to be understood that the adhesive and metallic anchoring devices may be used separately or together.

In some embodiments of the invention, where the metallic anchoring devices are employed, it is not necessary that the layer 12 have strong adhesive qualities, since it may merely serve as a bed to provide an even bearing surface between the glass facing and the concrete block surface, but the strongest type of construction naturally includes both anchoring devices.

The anchoring device 14 comprises a strip of soft bendable metal which has an attaching flange 15 and a securing flange 16. The attaching flange may have any form of anchoring formations 17 punched, cut or bent out of the body 15 in such manner as to engage in the concrete and secure the strip in place by the embedding of the anchors. The slit and twisted tongues 17 are merely one form of anchor which may be used, and myriad other forms will suggest themselves to any one skilled in the art.

Figure 4:
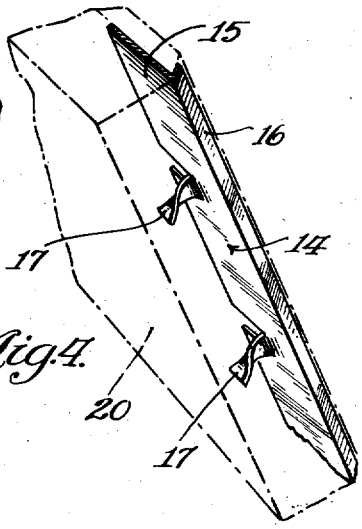
Fig. 4 is a view in perspective of the metallic anchoring device for the glass sheet, shown with a fragment of the concrete block in phantom.
Figure 6:
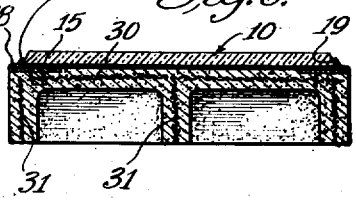
Fig. 6 is a sectional view taken through the block of Fig. 5, taken on the plane of the line 6—6, looking in the direction of the arrows.

The anchoring strip 14 may take the form of Fig. 4, or that of Fig. 6, in which the body 15 is bent back upon itself at 18 to form a bead 18 at the edge of the anchoring strip. The bead 18 carries the securing flange 16, which in each case extends upwardly at right angles to the body 15 at the time of construction of the block or pouring of the concrete.

In other embodiments of the invention the strip 14 may be made of resilient spring bronze which is bent to the positions shown in Figs. 4 and 6 at the time of the pouring of the block, and held in place by the engagement of the securing flanges 16 with the beveled edge surfaces 19 of the glass facing 10. In such case the flanges 15, which comprise the body of the strip 14, are overlapped at the corners of the block or tile and riveted, welded, soldered, or otherwise secured together so that the frame of the anchoring strips is secured about the beveled edges 19 of the glass 10. Where the soft, bendable type of metal strip is used, the securing flange 16 extends upwardly at right angles to the plane of the glass when the concrete is poured, and after the concrete has become hard the securing flange 16 is rolled, brazed, or otherwise bent over into engagement with the beveled edges 19 to augment the securing power of the adhesive 12.

The rear face 20 of the facing tiles is preferably made very rough, either through failure to float or otherwise smooth the free surface of the concrete tiles during their casting, leaving the concrete approximately as it is placed, or by scratching the surface when green with appropriate roughing devices.

When the tile is to be applied to a flat surface solely by metallic anchoring devices and without bonding to other cementitious material, then the rear surface 20 may be absolutely plane and smooth, as shown in Fig. 7.

Figure 5:
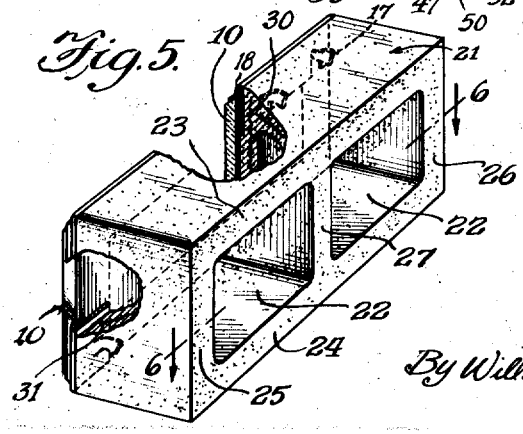
Fig. 5 is a view in perspective of a building block constructed according to the present invention.

Referring to Fig. 5, this is another embodiment of the invention, in which the facing is embodied in a building block or tile. The block, indicated in its entirety by the numeral 21, may be solid or it may have hollow spaces 22 in its rear side, bordered by the walls 23, 24, 25, 26, and the vertical reinforcing partition 27.

The tiles are preferably provided with a layer of wire mesh reinforcing 28, located adjacent the rear surface of the concrete, and another layer of wire mesh reinforcing 29 located adjacent the front surface of the concrete and extending throughout the complete area of the tile. Similarly the building blocks may be provided with a reinforcing 30, 31 disposed in the concrete according to the approved practice, and the mode of construction of the tiles and blocks constructed according to the present invention is as follows:

The glass is first prepared by placing a layer of paint 13 on the rear face of the glass sheet, and the paint is allowed to dry, thereby giving the glass a predetermined color. In case the glass has color fused in it, this step may be omitted. Any decorative or ornamental facing may be applied to the rear surface of the glass so that various patterns or effects may be secured to give the effects of mosaics or other known devices.

The glass sheet is then placed face downward; the layer of asphaltic adhesive is then applied to the rear painted surface of the glass sheet in an even sheet and in a wet or plastic condition, and the anchoring strips 14 are arranged about the edge of the glass sheet in the position shown in Fig. 4. The concrete is then poured in the form and jarred, vibrated, spaded or compressed, or any combinations of these modes of securing a compact concrete may be employed.

The tile or block has its reinforcing located before or during the pouring of the concrete in the usual manner, and the tile or block is allowed to set and cure in the usual manner. Various known methods of expediting the curing may, of course, be employed to secure a stronger concrete or quicker curing.

Figure 2:
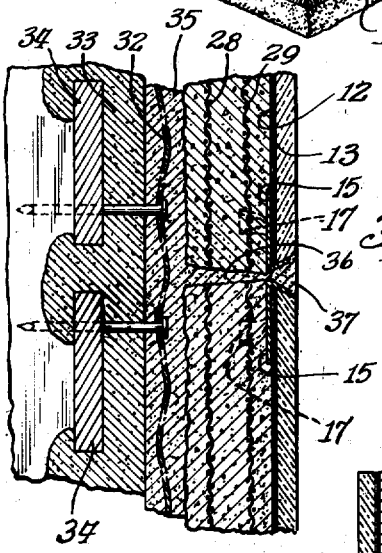
Fig. 2 is a sectional view through the adjacent edges two of the tiles constructed according to Fig. 1, installed upon an old plaster wall and anchored according to the present invention.

Referring, now, to Fig. 2, this shows the mode of installation of facing tile to a plastered surface by means of an additional bonding coat of plaster or cementitious material. A layer of expanded metal lath 32 is nailed or stapled to the plastered and lathed wall. Suitable nails or staples are employed and placed, so far as possible, to extend through the plaster 33 and hit not only the lath 34, but the studding wherever possible.

The metal lath is then given a rough coat 35 of plaster or mortar suitable for setting the tiles, and the tiles may be secured by pressing them into place in the mortar or plaster 35, which is provided with the usual fiber or hair. A thin layer of mortar 36 may be placed between each tile or block engaging the relatively rough concrete edges of the backing 11, and the tile will be firmly bonded, not only through engagement of its back, but through the adhesion of its edges to the mortar.

In order that space may be provided for this layer of mortar without enlarging the crack between the facing tile or blocks at the front of the tile, the form may be so constructed that its sides are removable and so that the backing 11 is backwardly beveled to provide a crack approximately of an eighth of an inch clearance between the concrete of the respective tiles or blocks at the rear face of the tiles or blocks. Furthermore, any of the conventional metal anchoring devices may be used, having laterally projecting lugs engaging in sockets in the tiles or blocks.

The cracks may then be pointed with further suitable composition or mortar 37, colored as desired, and adapted to prevent the entrance of water between the tile or glass facings.

Figure 3:
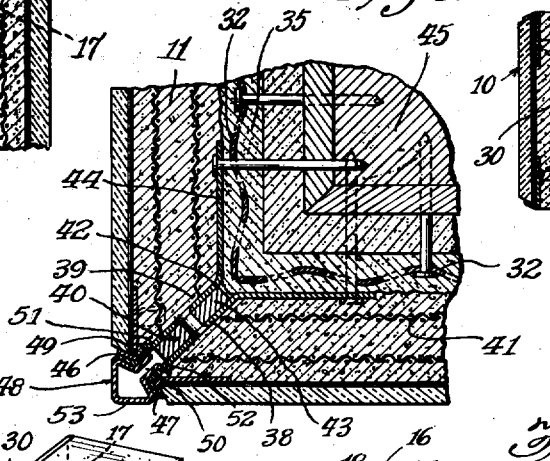
Fig. 3 is a sectional view taken through a corner of a construction including facing tiles constructed according to the present invention.

Referring to Fig. 3, this is a modification showing the same construction applied to an old plastered wall, with special means for anchoring the corner.

In this embodiment the metal lath 32 is nailed around the corner, care being taken to secure a solid footing for all nails, and a coat of plaster 35 is applied. The concrete backings 11 of the blocks are miter cut at the edges 38, 39 to leave space for an anchoring member 40.

The anchoring member 40 comprises a pair of metal strips 41, 42 secured to a stiff metal body 43 by rivets, as shown. The strips 41, 42 have attaching flanges 44, 45 at right angles to each other for receiving nails. The outer edges 46, 47 of these strips are bendable and are bent over against the beveled edges of the glass and against the anchoring strips 14 of the tile. The corner may be finished by a suitable filling of mortar.

I prefer to use a finishing strip 48, comprising a strip of metal which is resilient, and which is bent upon itself to form the two inwardly extending flanges 49 and 50. These flanges may have the tongues 51 struck out of them or bent outward at the edges to engage in the slots and against the shoulders formed by striking out the tongues 52 in the metal strips 41, 42.

The face portion 53 of this finishing strip 48 may be formed with a right angle like a corner, with a partially cylindrical surface, or with a flat surface, giving the corner a beveled appearance.

Referring to Fig. 7, this is a modification in which the tiles are secured in place without the necessity for using mortar. In this case the tile may be secured directly to the plaster coat 33, to a wooden wall, or to any flat surface to which the anchoring members 40 can be fastened. They may be secured even to a metal wall by means of wedging nails, rivets, or screws and tapped holes in the wall. The nails 55 may then be regarded as exemplary of many different securing devices.

The construction of the anchoring member 40 is substantially the same as the one described with respect to Fig. 3. It has the attaching flanges 44, 45 and the two strips 41, 42 of bendable sheet metal secured to a metal body strip 43 by rivets. The metal body strip 43 is preferably narrower than the bendable strips 41, 42, leaving the retaining flanges 46, 47 which may be bent over to engage the glass 56, 57.

The tile in this illustration is of a type in which the glass 56 is secured to the backing 11 by a layer of adhesive 12, the anchoring strips 14 being omitted, since the securing flanges 46, 47 are adapted to engage the beveled edges of the glass and positively prevent any separation after the glass tiles have been installed.

After the anchoring members 40 are fastened to the wall and the tiles have been put in place, the flanges 46, 47 are bent, rolled or spun over into engagement with the beveled edges of the glass plates 56, 57. The crack between these flanges may be filled with a suitable mortar 58, which may include the adhesive material 12.

Referring to Fig. 8, this is a fragmentary view of a modified construction in which it is unnecessary to employ any adhesive or metal anchoring devices in the tile. In this case the backing 59 is of the same concrete, suitably reinforced as shown, and provided with rough back surfaces 60 and edge surfaces 61. The glass 62 is of a type which has a bonding means 63 integrally secured to the rear face of the glass plate during its manufacture.

When the glass plate is made, slivers 63 of glass are integrally embedded into the rear face of the glass plate 62, as follows:

After the glass plate 62 is poured and before it is entirely hard, slivers or small angularly shaped pieces of glass 63 are sprinkled upon the soft surface of the glass plate and permitted to embed themselves therein. If the glass is not sufficiently soft the embedment may be assisted by slight pressure. This makes the rear surface of the glass plate 62 so rough and the slivers extend in random directions in such manner that the glass plate may be bonded to the concrete without any additional adhesive or metallic anchoring devices. The glass slivers 63 constitute integral glass anchoring means or bonding surfaces.

Referring to Fig. 9, this is a diagrammatic view of a portion of a wall which is equipped with tile having anchoring members constructed according to Fig. 7. The anchoring members 40 constructed in this way may be made at the factory and so interlocked with transversely extending anchoring members of the same type that a multiplicity of sockets are formed for the tile.

Referring to Fig. 10, it will be observed that where two body strips 43, 43A cross each other the body strip 43 may have a slot cut at 64 from the bottom upward to half its width to receive the body strip 43A. The body strip 43A has a similar slot 65 cut downward from the top half way into the strip. The slots are thick enough to receive the body strips, and when assembled together, as shown in Fig. 10, they are so interlocked that they may be secured together to form a fixed framework.

In order to construct the frame, a multiplicity of sheet metal strips 41, 42 must be secured to the body strips 43 in between the corner joints. Thus the only strips of long stock used are the relatively strong body strips 43, which may be made of any non-corrodible metal such as brass, suitably treated steel, or galvanized iron.

Referring, now, to Fig. 9, the lines 67 extending horizontally represent the joints or anchoring strips extending horizontally on the wall between the tiles. The vertical lines 68 represent vertically extending anchoring strips or joints between tiles.

The cap-stone lines 69 at the top of the window represent an irregular formation or framework of anchoring strips, which may also be built up out of the anchoring members 40. The anchoring members 40, secured together as shown in Fig. 10, may be built up at the factory in the form of a complete framework or sections of a complete framework, each space between the anchoring strips being related to a tile for that space.

The framework may be nailed or otherwise secured to the wall, as shown in Fig. 7, and each tile may be placed in its place. As soon as the tiles have been put in place, the adjacent bendable securing flanges 46, 47 may be bent over to engage the beveled edge of the glass or adjacent metal surface 16. The spaces between the tiles may then be pointed up with mortar, as shown at 58, in Fig. 7.

With the construction shown in Figs. 7, 9, and 10, it will be evident that the weight of the tile is borne by the metal framework, and there is no excessive load on any tile due to the tile above it. Furthermore, the pattern of the tile facing is predetermined at the factory by the construction of the framework of the metal, which can be more accurately constructed than tile can be installed at the job in the usual way. Where workmen install tiles one by one and secure them according to the prior art, it is possible for the tiles to get completely out of alignment at the end of the work, and very skillful and careful work is required to assure a uniform job. According to the present method, however, the tile cannot get out of alignment or spacing because each tile has its place in the metal framework.

Figure 11:
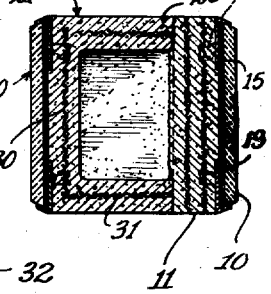
Fig. 11 is a fragmentary view of a block having a glass facing on both sides, and peculiarly adapted to be used for partitions.

Referring to Fig. 11, this is a fragmentary view of a block of the type of Fig. 5, in which both faces of the block are provided with a facing of glass. The block may be constructed by first making a tile of the type shown in Fig. 1, then constructing a block of the type shown in Fig. 5, and before the concrete of the block has become set the tile has its roughened back surface pressed against the face 23 of the tile and secured by bonding with the mortar of the tile.

Such double faced blocks may be used for partitions in a great many places, such as gas stations, cellars, houses, and they have the advantage that when the tile is installed it is not necessary to apply any facing plaster or other finishing coat to the tile. The wall is substantially complete when the block is installed.

Another method of making double faced blocks comprises the placing of the glass according to the method previously described, at both sides of the form, then filling the form as described, using a suitable core which may open at either end of the block.

In a similar manner, it will be understood by those skilled in the art, corner tile or corner blocks may be made. Curved tiles or blocks may be constructed, and there are myriads of different shapes which the tiles or blocks may take within the scope of the present invention.

It will thus be observed that I have invented an improved building construction in which new facing tiles or building blocks are employed. The present facing tiles or blocks may be constructed at a very low cost because ordinary window glass may be employed.

According to the present methods, window glass may be so tightly bonded, anchored, or otherwise secured to the concrete backing that there is no danger of it ever becoming loose. The concrete backing greatly increases the strength of the assembly, and such tile or blocks may be employed for flooring as well as walls, as it has been demonstrated that they have sufficient strength to support heavy loads. Various decorative effects may be secured by painting the rear faces of the window glass panes, or by employing colored glass or other ornamental materials.

The concrete-backed tiles or blocks are very securely bonded to any concrete construction because of the rough concrete edges and rear faces of the tiles or blocks. The tiles may also be secured to any other type of surface by means of the improved anchoring members previously described, which may be attached by nails, screws, bolts, or other fastening means.

The glass is backed up by the concrete, and the glass and concrete are held together with a metal binder securely anchored into the concrete and glass. There is no possible chance for the glass to fall out. The concrete can be bonded or secured to any kind of building material just like any other brick or building block, and can be solidly backed up with mortar.

Another advantage of the present building tiles or blocks is that if the glass facing is broken it may be removed, and by means of the cement and/or securing flanges of the anchoring devices a new plate of glass may be secured in its place.

Another advantage lies in the fact that the concrete backing which supports the anchoring strips shrinks as it hardens and it grips the glass plates resiliently and more firmly.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a building member, the combination of a cementitious backing with a glass facing plate having beveled edges, metallic anchoring strips engaging and holding said glass facing plate at its beveled edges and having anchoring members struck out of said strip and extending rearwardly and embedded in the cementitious backing, said metallic anchoring strips having resilient beads formed at the edges of the member substantially flush with the outer faces of the backing whereby the resilient beads engage each other when the building members are placed one upon another.

2. A supporting means for tile comprising a metal body strip having a bendable metal flange secured thereto, integral anchoring flanges struck out of said body strip and extending rearwardly therefrom and utilized to secure said supporting means to a support by being embedded in cementitious material, said metal flange extending at an acute angle to said body strip and being adapted to be laterally bent with respect to said body strip to engage beveled edges upon tiles carried by said securing means, and to permit expansion of said tile with respect to its support through movement of said bendable flange.

3. In a wall construction, the combination of a support with a plurality of facing tiles, said facing tiles having outwardly beveled edges, thereby providing a beveled shoulder for engagement with securing flanges on each edge of the tile and securing means carried by said support comprising metallic flanges which project between said facing tiles and are laterally bent to engage said beveled surfaces whereby the tile is secured in place or may be removed by bending said securing flanges out of engagement with said beveled surface to replace any tile.

4. In a wall construction, the combination of a support with a plurality of facing tiles, said facing tiles having outwardly beveled edges, thereby providing a beveled shoulder for engagement with securing flanges on each side of the tile and securing means carried by said support comprising metallic flanges which project between said facing tiles and are laterally bent to engage said beveled surfaces whereby the tile is secured in place or may be removed by bending said securing flanges out of engagement with said beveled surface to replace any tile, each of said tiles being separately supported by said securing flanges, whereby vitreous facings may be used without placing any load upon the edges of the vitreous facings other than the weight of each separate facing.

5. In a facing tile for walls and the like, the combination of a supporting block with a facing or ornamental material, said facing comprising a sheet having its edges beveled inwardly toward each other at the outer face thereof and securing means carried by said block for supporting said facing sheet, said securing means comprising metal strips having outwardly projecting flanges bent at an acute angle to engage the beveled edges of said facing sheet, the supporting means extending beyond the edges of the facing sheet upon the load supporting sides of the block whereby the facing sheet does not support any load.

6. In a facing tile for walls and the like, the combination of a supporting block with a facing or ornamental material, said facing comprising a sheet having its edges beveled inwardly toward each other at the outer face thereof, and securing means carried by said block for supporting said facing sheet, said securing means comprising metal strips having outwardly projecting flanges bent at an acute angle to engage the beveled edges of said facing sheet, the supporting means extending beyond the edges of the facing sheet upon the load supporting sides of the block whereby the facing sheet does not support any load, said metallic strips being arranged with a main body extending into said block directly under said facing sheet and having anchoring members extending backwardly into said block at a point spaced from the faces of the block.

7. In a facing tile for walls and the like, the combination of a supporting block with a facing or ornamental material, said facing comprising a sheet having its edges beveled inwardly toward each other at the outer face thereof and securing means carried by said block for supporting said facing sheet, said securing means comprising metal strips having outwardly projecting flanges bent at an acute angle to engage the beveled edges of said facing sheet, the supporting means extending beyond the edges of the facing sheet upon the load supporting sides of the block whereby the facing sheet does not support any load, there being a space between the bend of said securing flange and the acute edge of said facing plate whereby the facing plate is permitted to expand without its acute edge engaging the bend in the metallic securing flanges and the expansion is permitted by the varying angularity of the securing flange.

8. In a building member, the combination of a cementitious backing with a vitreous facing plate having beveled edges, metallic anchoring strips engaging and holding said glass facing plates at its beveled edges and having anchoring members struck out of said strip and extending rearwardly and embedded in the cementitious backing, said metallic anchoring strips having resilient beads formed at the edges of the member substantially flush with the outer faces of the backing whereby the resilient beads engage each other when the building members are placed one upon another, said cementitious backing having its edges beveled to provide space for mortar between the backing of the two tiles and bond the tile to the cementitious support at their backs and edges.

9. A building block comprising a load bearing body member, a non-load bearing face plate associated with one surface of said body member, metallic members secured to the body member and having portions engaging the face plate to hold the same in position, said load bearing body member having portions extending beyond the edges of the face plate in a plane parallel with the plane of said face plate and also beyond those portions of the metallic members engaging said face plate for carrying the load of the wall when the blocks are laid up in a wall and for spacing the face plates of vertically adjacent blocks from one another when said blocks are placed one upon the other whereby said face plates do not support any load of the wall.

10. A building block comprising a load bearing body member formed from a cementitious material, a non-load bearing face plate associated with one surface of said body member, and metallic members carried by and having portions embedded in the body member and other portions engaging the edges of the face plate to hold the same in position, said load bearing body member having portions extending beyond the edges of the face plate in a plane parallel with the plane of said face plate and also beyond those portions of the metallic members engaging the edges of the face plate for carrying the load of the wall when the blocks are laid up in a wall and when laid up in a wall the face plates of vertically adjacent blocks being in spaced relation whereby said face plates are free of wall load.

11. A building block comprising a load bearing body member formed from a cementitious material, a non-load bearing face plate associated with one surface of said body member, and metallic members engaging said face plate and body member for securing the former to the latter, each metallic member comprising a body portion received behind the face plate and provided with a forwardly directed flange engaging the respective edge of said face plate and an anchoring portion embedded in said body member, said load bearing body member having portions extending beyond the edges of the face plate in a plane parallel with the plane of said face plate and also beyond the flanges of the metallic members engaging the edges of the face plate for carrying the load of the wall when the blocks are laid up in a wall and when laid up in a wall the face plates of vertically adjacent blocks being in spaced relation whereby said face plates are free of wall load.

12. A building block comprising a load bearing body member formed from a cementitious material, a non-load bearing face member associated with one surface of said body member, and metallic members carried by and embedded in the body member and having flanges engaging the edges of said face plate, said metallic members also having portions projecting beyond the edges of said face plate and also beyond the corresponding flanges upon the load supporting sides of the block to such an extent that when the blocks are placed one upon another, with said projecting portions of said metallic members in engagement with one another, the face plates and corresponding metal flanges of vertically adjacent blocks will be spaced from one another so that said face plates will not support any load.

RUDOLPH KALKUSCH.